United States Patent
McClure

(10) Patent No.: US 11,340,958 B2
(45) Date of Patent: May 24, 2022

(54) REAL-TIME SIMULATION OF COMPUTE ACCELERATOR WORKLOADS FOR DISTRIBUTED RESOURCE SCHEDULING

(71) Applicant: VMware, Inc., Palo Alto, CA (US)

(72) Inventor: Matthew D. McClure, Alameda, CA (US)

(73) Assignee: VMWARE, INC., Palo Alto, CA (US)

( * ) Notice: Subject to any disclaimer, the term of this patent is extended or adjusted under 35 U.S.C. 154(b) by 27 days.

(21) Appl. No.: 16/923,137

(22) Filed: Jul. 8, 2020

(65) Prior Publication Data

US 2022/0012104 A1 Jan. 13, 2022

(51) Int. Cl.
*G06F 9/50* (2006.01)
*G06F 9/48* (2006.01)

(52) U.S. Cl.
CPC .......... *G06F 9/5088* (2013.01); *G06F 9/4856* (2013.01); *G06F 2209/501* (2013.01)

(58) Field of Classification Search
CPC . G06F 9/5088; G06F 9/4856; G06F 2209/501
See application file for complete search history.

(56) References Cited

U.S. PATENT DOCUMENTS

| | | | | |
|---|---|---|---|---|
| 10,162,665 B1* | 12/2018 | Eidelman | ................ | G06F 13/24 |
| 10,402,227 B1* | 9/2019 | Kinney, Jr. | ........... | G06F 9/4881 |
| 2019/0087341 A1* | 3/2019 | Pugsley | .............. | G06F 12/0897 |
| 2019/0361724 A1* | 11/2019 | McClure | ............... | G06F 9/4856 |
| 2019/0361732 A1* | 11/2019 | McClure | ............... | G06F 9/4856 |
| 2021/0168078 A1* | 6/2021 | Ma | ........................ | G06F 9/5083 |

* cited by examiner

*Primary Examiner* — Sisley N Kim
(74) *Attorney, Agent, or Firm* — Thomas Horstemeyer, LLP

(57) ABSTRACT

Disclosed are various embodiments of real-time simulation of the performance of a compute accelerator workload for distributed resource scheduling. The compute accelerator workload is executed on candidate hosts to select a destination host. Efficiency metrics are determined for the candidate hosts based on the execution of the compute accelerator workload on the candidate hosts. A destination host is selected from the candidate hosts based on the efficiency metrics, and the compute accelerator workload can be assigned to execute on the selected destination host.

14 Claims, 4 Drawing Sheets

REAL-TIME SIMULATION OF COMPUTE ACCELERATOR WORKLOADS FOR DISTRIBUTED RESOURCE SCHEDULING

BACKGROUND

Various types of computational tasks are often more efficiently performed on specialized computer hardware than on general purpose computing hardware. For example, highly parallelizable algorithms or operations on large datasets are often performed more quickly and efficiently if off-loaded to a graphics processing unit (GPU) than if they are implemented on a general purpose central processing unit (CPU). Likewise, application specific integrated circuits (ASICS) are often able to implement an algorithm more quickly than a CPU, although the ASICS may be unable to perform any computation other than the algorithm which they are designed to implement.

In the cloud computing context, data processing is often performed by servers operating in a datacenter. These servers often have very powerful CPUs, GPUs, and other dedicated hardware that allows them to perform computations much more quickly than a client device. As a result, client devices often upload datasets directly to servers in the datacenter for processing. Accordingly, the computing resources of the client devices may be underutilized or unutilized even if they are well-suited for performing some computational tasks. For example, a GPU of a client device may be able to perform some initial image processing, thereby reducing the amount of data that has to be sent to a server and minimizing the amount of bandwidth consumed by the client device when communicating with the server.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to real-time simulation of compute accelerator workloads for distributed resource scheduling. Due to multiple variables contributing to system performance and the asynchronous nature of a compute accelerator, existing resource scheduling prediction algorithms are insufficient to predict aggregate system performance for a compute accelerator workload. Compute accelerators can communicate with the central processing unit (CPU) and main memory over peripheral component interconnect express (PCI-e), universal serial bus (USB), and other interconnects. To access main memory, a compute accelerator can initiate a Direct Memory Access (DMA) operation. A memory management unit (MMU) can act as an arbiter of both CPU and compute accelerator DMA access. Asynchronous access can create bus or interconnect contention as well as memory contention. This can also invalidate CPU cache contents, causing added stalls. Compute accelerators can execute compute accelerator workloads submitted at command buffer granularity and may have limited application programming interface (API) support for re-prioritizing and pre-emption of compute accelerator workloads.

In the context of consolidation of compute accelerator workloads, multiple compute accelerator workloads can expect exclusive access to the underlying resources for a system. Long running compute kernels that read/write main memory can create extended periods of bus contention, memory contention, and invalidation of CPU caches leading to an exponential slowdown. This can decrease performance for both the CPU and the compute accelerator, as both can be waiting on a common interconnect. One compute accelerator's architecture may not be as performant as another for a particular compute accelerator workload. Local memory bus width, clock, or interconnect technology can differ from one host or computer accelerator to the next. Long running compute kernels can make it impossible for existing systems to gather historical data when the compute kernel does not terminate. All of these issues can result in poor evaluation and suboptimal resource scheduling of compute accelerator workloads. However, the present disclosure describes mechanisms capable of accurately predicting the performance of a compute accelerator workload for migration and other resource scheduling scenarios.

Figure 1:
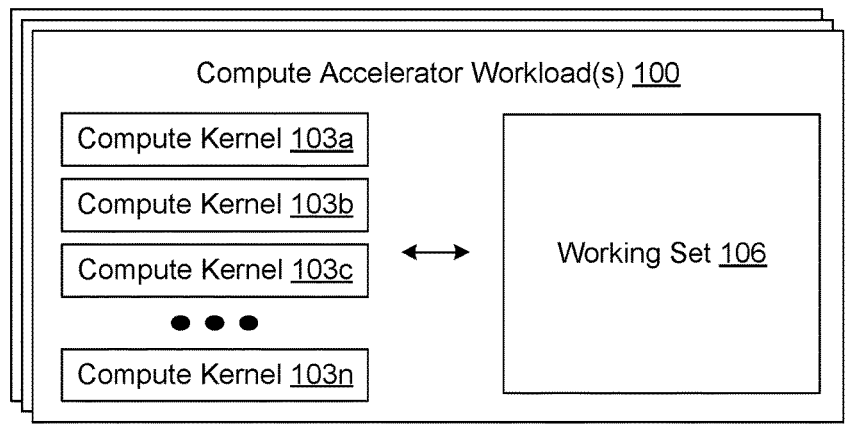
FIG. 1 is a drawing depicting an example of a compute accelerator workload processed by various embodiments of the present disclosure.

FIG. 1 depicts an example of a compute accelerator workload 100. A compute accelerator workload 100 is a representation of a computer-executable application and/or components of an application, such as a computer-executable task, job, process, sub-routine, or thread. The compute accelerator workload 100 can include one or more compute kernels 103a, 103b, 103c, . . . 103n, which can allow for portions of the compute accelerator workload 100 to be executed in parallel or on separate computing devices. The compute accelerator workload 100 can also include a working set 106, which represents the memory locations or data utilized by the compute accelerator workload 100. The working set 106 can include inputs processed by an application generally or one or more compute kernels 103a-n specifically.

A compute kernel 103 is an executable function or sub-routine of the application that is compiled and assigned for execution by a virtualized compute accelerator or a compute accelerator. Accordingly, the compute kernel 103 may be configured to operate on one or more inputs from the working set 106 and provide or contribute to one or more outputs to be stored in the working set 106. Because compute accelerators are often connected to the central processing unit (CPU) by various data bus interfaces or network connections, there is often a measurable latency between when a compute accelerator workload 100 assigns a compute kernel 103 to a compute accelerator 203 for execution and when execution actually begins. Accordingly, applications and other compute accelerator workloads 100 are often programmed to make use of compute kernels 103 using a deferred execution model, whereby the compute kernel 103 and a portion of the working set 106 are sent to a compute accelerator and the CPU waits to receive the results of the computation performed by the compute kernel 103.

The working set 106 represents the data being processed by the compute accelerator workload 100. This can include various input parameters provided to the compute accelerator workload 100, such as arguments or other data provided to the compute accelerator workload 100 at the time that the compute accelerator workload 100 is initiated or data is retrieved by the compute accelerator workload 100 at a later point (e.g., datasets, database tables, etc.). The working set 106 can also include the results of intermediate computation, such as the output of a function or compute kernel 103, which may be used as the input for another function of the compute accelerator workload 100 or a compute kernel 103. The working set 106 can also include the results of any computation performed by the compute accelerator workload 100 or its compute kernels 103.

Figure 2A:
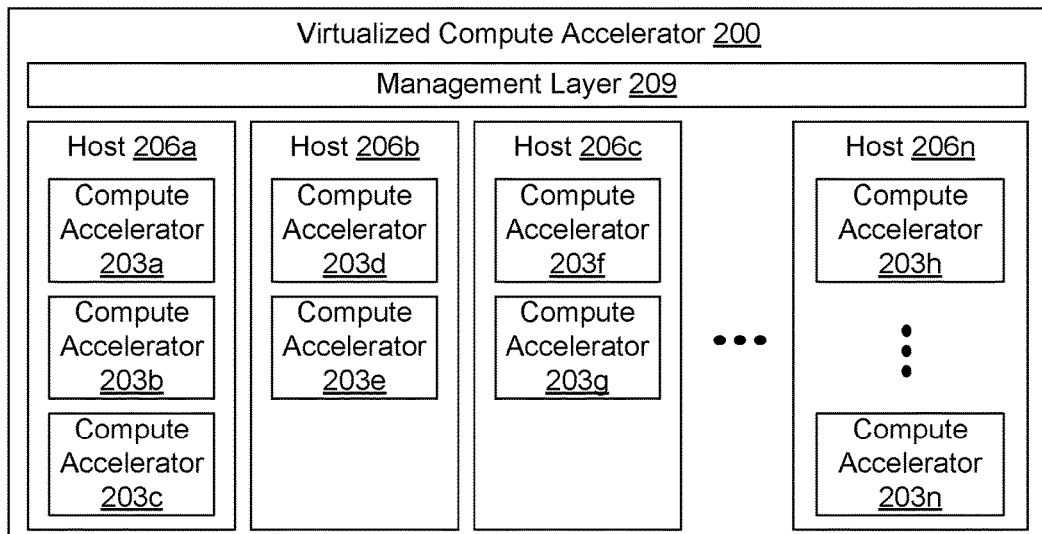
FIG. 2A is a drawing depicting a virtualized compute accelerator according to various embodiments of the present disclosure.

FIG. 2A depicts an example of a virtualized compute accelerator 200. A virtualized compute accelerator 200 is a logical representation of or logical interface for a plurality of compute accelerators 203a . . . 203n (compute accelerators 203), which may be installed across a plurality of hosts 206a . . . 206n (hosts 206). The virtualized compute accelerator 200 may provide an application programming interface (API) that allows the virtualized compute accelerator 200 to be presented to an individual instance of a compute accelerator 203. For example, the virtualized compute accelerator 200 could provide a device driver that could be installed on a computing device or a virtual machine (VM) to provide access to the resources of the virtualized compute accelerator 200.

The virtualized compute accelerator 200 can also include a management layer 209. The management layer 209 can include one or more components of a management service which can be executed to perform resource scheduling. Resource scheduling can include assigning individual compute accelerator workloads 100 or portions of compute accelerator workloads 100, such as individual compute kernels 103, to one or more of the compute accelerators 203 that underlie the virtualized compute accelerator 200. Resource scheduling services can also include live migrations of compute accelerator workloads 100. For example, if a compute accelerator workload 100 has three compute kernels 103a, 103b, and 103c assigned to the virtualized compute accelerator 200, the management layer 209 associated with the virtualized compute accelerator 200 could analyze the compute kernels 103 and assign them to individual ones of the hosts 206a . . . 206n (the hosts 206) compute accelerators 203a . . . 203n (the compute accelerators 203) and according to various criteria, as discussed later. For instance, the virtualized compute accelerator 200 could assign compute kernel 103a to compute accelerator 203a of host 206a, compute kernel 103b to compute accelerator 203e of host 206b, and compute kernel 103c to compute accelerator 203g of host 206c. In other cases, a workload 100 and all of its compute kernels 103, can be assigned to a host 206, while another workload 100 is assigned to another host 206.

A compute accelerator 203 can include a peripheral device installed on a computing device, such as a host 206, that accelerates the processing of mathematical operations submitted to the compute accelerator 203 by an application executing on a central processing unit (CPU) of the computing device. Some compute accelerators 203 can be used to accelerate a wide variety of mathematical operations, allowing for their use in general purpose computing. Other compute accelerators 203 can be used to accelerate specific mathematical operations. Examples of compute accelerators 203 include graphics processing units (GPUs), artificial intelligence accelerators, field programmable gate arrays (FPGAs), digital signal processing units (DSPs), and cryptographic accelerators. However, any application specific integrated circuit (ASIC) may be able to be used as a compute accelerator 203.

A host 206 is a computing device that has one or more compute accelerators 203 installed. Examples of hosts 206 include servers located in a datacenter performing computations in response to customer requests (e.g., "cloud computing"), client devices (e.g., personal computers, mobile devices, edge devices, Internet-of-Things devices etc.) with compute accelerators 203 installed. However, any computing device which has a compute accelerator 203 installed may be added to the virtualized compute accelerator 200 as a host 206.

Figure 2B:
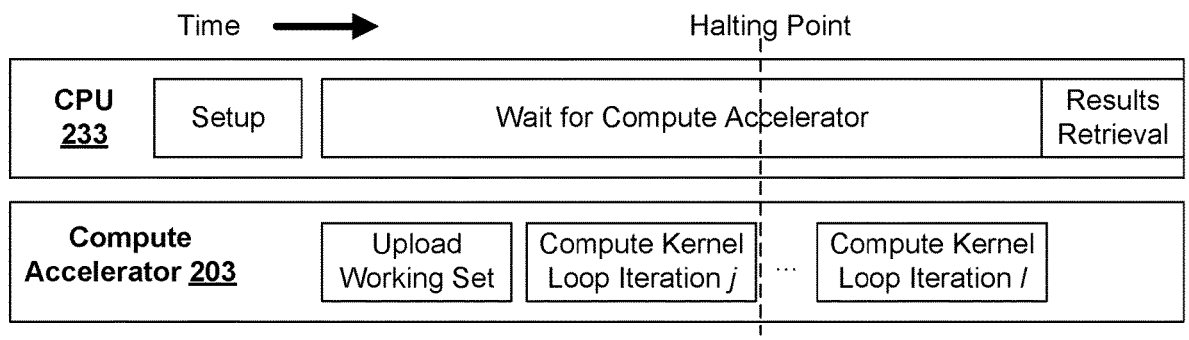
FIG. 2B is a drawing depicting execution of a compute accelerator workload according to various embodiments of the present disclosure.

FIG. 2B shows an example of execution of a compute accelerator workload 100. The execution of an application can include a setup process by a CPU 233 of a host 206. However, the compute accelerator 203 can perform the compute accelerator workload 100 associated with the application. As the compute accelerator 203 executes a compute accelerator workload 100 or a compute kernel 103, the compute accelerator 203 can upload the working set 106 and then start to compute kernel loop iterations j through l. While the loop iterations j through 1 are being computed, the CPU 233 waits for the compute accelerator 203, and the CPU 233 can appear to be underutilized. Thus, CPU utilization can provide a poor estimate of efficiency for resource scheduling decisions for compute accelerator workloads 100. Conventional systems can wait for results retrieval at an end of all kernel loop iterations before the speed or efficiency can be determined. Long-running or persistently-running applications can pose problems for effective resource scheduling. The compute kernels 103 can include artificial or injected halting points, for example, at the end of loop iterations. The compute kernels 103 can be further augmented to include performance counters that allow for effective measurement or calculation of efficiency of a workload 100 on particular hosts 206.

Figure 3:
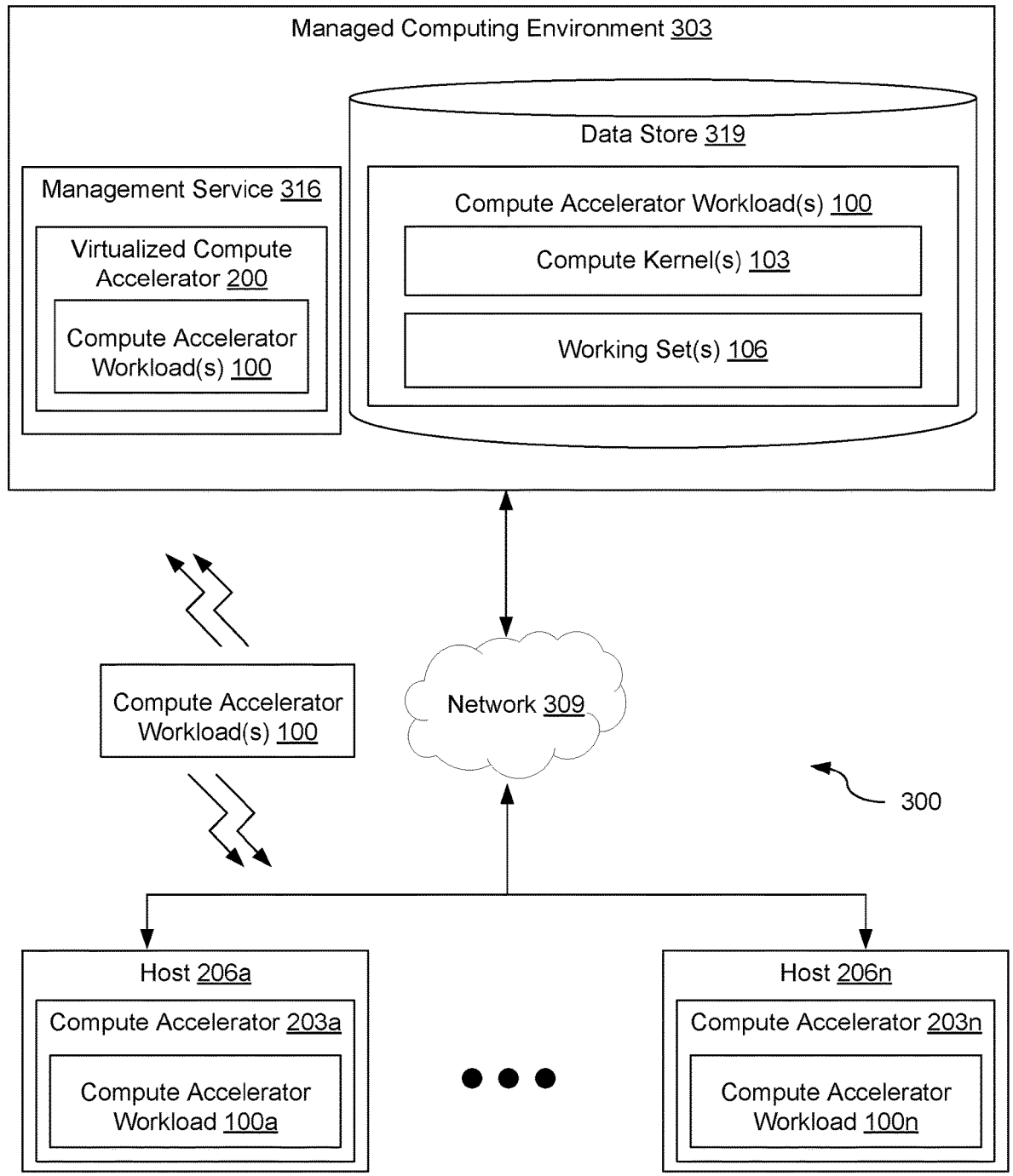
FIG. 3 depicts an example of a networked environment that includes a managed computing environment and a number of hosts, according to various embodiments of the present disclosure.

FIG. 3 depicts an example of a networked environment 300 according to various embodiments. The networked environment 300 includes a managed computing environment 303, and one or more hosts 206a . . . 206n (hosts 206), which are in data communication with the managed computing environment 303 via a network 309. The hosts 206 can include compute accelerators 203a . . . 203n (compute accelerators 203). Compute accelerator workloads 100a . . . 100n (compute accelerator workloads 100) can be executed using a compute accelerator 203 and a corresponding host 206. The network 309 can include wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 309 can also include a combination of two or more networks 309. Examples of networks 309 can include the Internet, intranets, extranets, virtual private networks (VPNs), and similar networks.

The managed computing environment 303 can include a server computer or any other system providing computing capability, such as hosts 206. Alternatively, the managed computing environment 303 can employ a plurality of computing devices such as the hosts 206 that can be arranged, for example, in one or more server banks, computer banks, or other arrangements and can be connected using high-speed interconnects. Such computing devices can be located in a single installation or can be distributed among many different geographical locations. For example, the managed computing environment 303 can include a plurality of computing devices that together can include a hosted computing resource, a grid computing resource, or any other distributed computing arrangement. In some cases, the managed computing environment 303 can correspond to an elastic computing resource where the allotted capacity of processing, network, storage, or other computing-related resources can vary over time.

Various applications or other functionality can be executed in the managed computing environment 303 according to various embodiments. The components executed on the managed computing environment 303, for example, include the virtualized compute accelerator 200, and the management service 316. In some instances, the hosts 206 can implement virtual machines executed by one or more computing devices in the managed computing environment 303. The virtualized compute accelerator 200 is executed to provide a logical representation or logical interface for one or more hosts 206 to interact with a plurality of compute accelerators 203. The virtualized compute accelerator 200 can include or communicate with a resource scheduler of the management service 316. The virtualized compute accelerator 200 can be a component implemented by the management service 316. Commands sent to the virtualized compute accelerator 200 can be assigned by the virtualized compute accelerator 200 or to one or more of the compute accelerators 203 that underlie the virtualized compute accelerator 200. The results of the commands can then be provided to the hosts 206. Accordingly, the virtualized compute accelerator 200 may be implemented as a device driver for a virtualized or paravirtualized hardware device, for one or more hosts 206.

Various data is stored in a data store 319 that is accessible to the managed computing environment 303. The data store 319 can be representative of a plurality of data stores 319, which can include relational databases, object-oriented databases, hierarchical databases, hash tables or similar key-value data stores, as well as other data storage applications or data structures. The data stored in the data store 319 is associated with the operation of the various applications or functional entities described below. For example, the data store 319 can store compute accelerator workloads 100, including compute kernels 103 and working sets 106.

A working set 106 can include data being processed or to be processed by an application, which can include data being processed or to be processed by one or more compute kernels 103 of a compute accelerator workload 100. The data represented by the working set 106 can include inputs or initialization data provided to the compute accelerator workload 100 when it begins execution (e.g., application arguments), the final results or output of the compute accelerator workload 100 when it finishes execution, as well as intermediate data. Intermediate data can include the input or arguments to individual compute kernels 103 and the output or results of individual compute kernels 103, which may then be used as the input of additional compute kernels 103.

Next, a general description of the operation of the various components of the networked environment 300 is provided. Additional detail of the implementation of specific operations or components is provided in the accompanying discussion of the subsequent figures. The networked environment 300 may be configured for hosting a compute accelerator workload 100, including the execution of a compute kernel 103 specified by the compute accelerator workload 100. Accordingly, one or more hosts 206 may be assigned to execute the compute accelerator workload 100 (e.g., physical servers in a data center, virtual machines in a virtualized or hosted computing environment, or combinations thereof). A virtualized compute accelerator 200 may also be instantiated and individual compute accelerators 203 installed on hosts 206 added to the virtualized compute accelerator 200.

Management service 316 can analyze the managed computing environment 303 including the compute accelerators 203 and hosts 206 in order to perform resource scheduling actions including initial placement, replication, and migration of compute accelerator workloads 100. This can also include resource scheduling and augmentation of individual compute kernels 103.

As the compute accelerator workload 100 is executed by the host(s) 206, one or more compute accelerator workloads 100 or compute kernels 103 can be spawned or instantiated for execution. The compute accelerator workloads 100 and the compute kernels 103 can be provided to the virtualized compute accelerator 200 for execution. Upon completion of the execution of components of the compute accelerator workloads 100, the virtualized compute accelerator 200 can provide the results to the management service 316, which may include the result data itself or references to the result data stored in the working set 106.

Upon receipt of a compute accelerator workload 100 or individual compute kernels 103, the management service 316 can determine which compute accelerator(s) 203 to assign the compute accelerator workload 100 or individual compute kernels 103 for execution. The determination can be based on a variety of factors, including the nature of the computation, the performance capabilities or location of individual compute accelerators 203, and potentially other factors. The management service 316 can utilize mechanisms to accurately predict the performance of a compute accelerator workload 100 on a set of candidate hosts 206, and migrate the compute accelerator workload 100 to a selected host 206 based on the performance calculations. This process is described in further detail with respect to FIG. 4.

The management service 316 can assign a compute accelerator workload 100 to a compute accelerator 203 that has a sufficient amount of memory to execute its compute kernel or kernels 103. As another example, if the management service 316 determines that a compute kernel 103 is processing data generated by another workload on a particular host 206, the management service 316 can assign the compute accelerator workload 100 to that host 206. For example, if a compute accelerator workload 100a is performing image processing operations on images or videos captured by a camera of a host 206a associated with an edge node (e.g., an Internet-of-Things device, a smartphone, tablet, or other device), the management service 316 may assign the compute accelerator workload 100a to the compute accelerator 203a (e.g., graphics processing unit) installed on the same host 206a in order to minimize the amount of bandwidth consumed by transmitting unprocessed images or video across the network 309.

Figure 4:
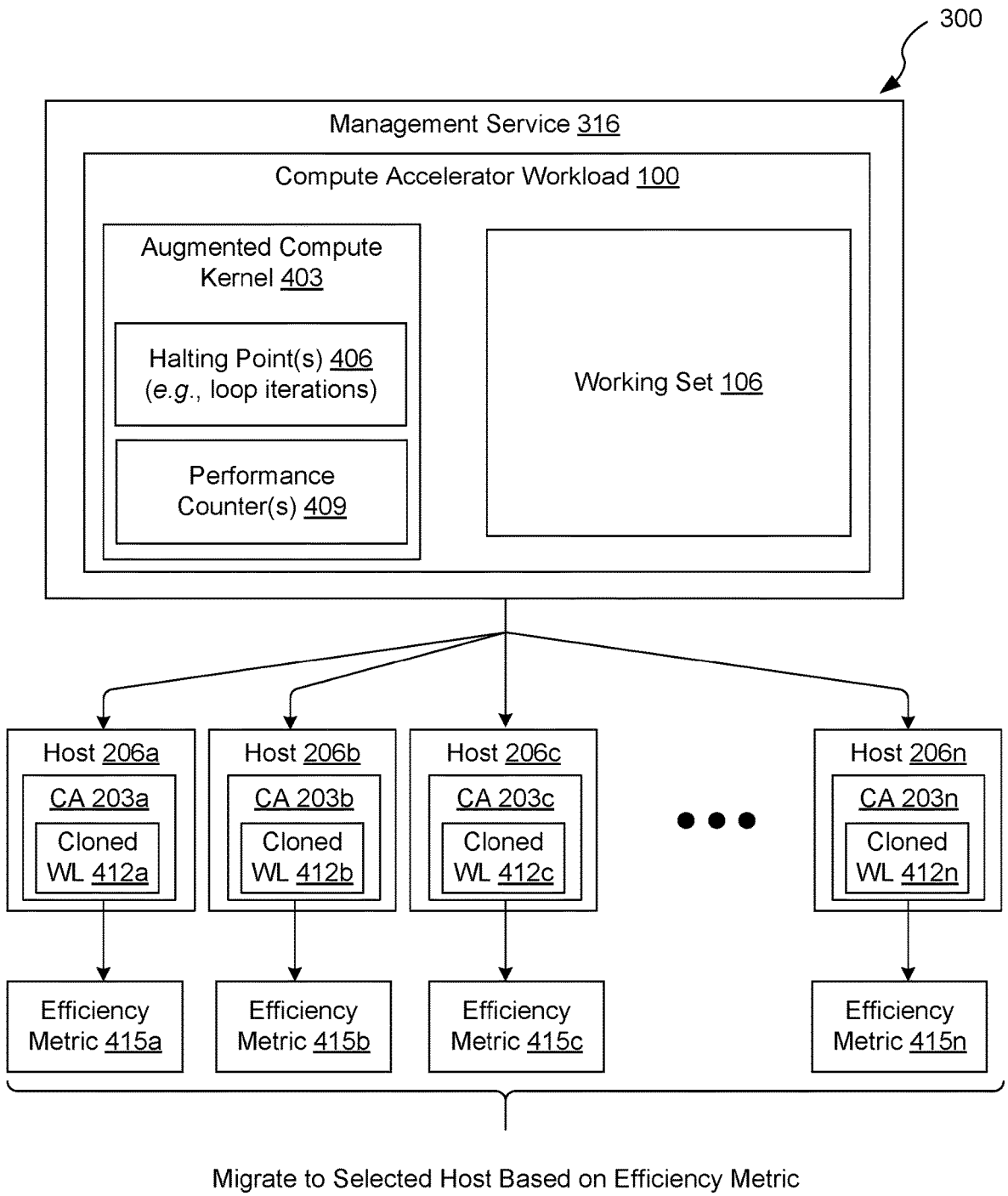
FIG. 4 is a drawing depicting an example of functionalities performed by components of the networked environment of FIG. 3, according to various embodiments of the present disclosure.

FIG. 4 shows an example of functionalities performed by components of the networked environment 300 of FIG. 3. Generally, this figure describes example mechanisms that are utilized by the management service 316 to determine performance of a compute accelerator workload 100 on a set of candidate hosts 206a . . . 206n that include compute accelerators 203a . . . 203n, and migrate the compute accelerator workload 100 to a selected destination host 206 based on the measured performance of the compute accelerator workload 100 on the selected host 206 and corresponding compute accelerator 203.

As mentioned above, a computer accelerator workload 100 can include one or more compute kernels as well as a working set 106. The management service 316 can augment a compute kernel to generate an augmented compute kernel 403 that includes halting points 406. As a result, halting points 406 can be considered artificial halting points. The management service 316 can analyze the compute kernel 103 to identify code that indicates a loop. The management service 316 can insert a halting point 406 at the beginning of a code segment for each iteration of the loop. The management service 316 can also insert a halting point 406 at the end of a code segment for each iteration of the loop. Further, the management service 316 can predict execution time of a code segment and insert a halting point 406 at a selected point, if the predicted execution time exceeds a threshold.

The halting point 406 can include code that includes a program counter label and a predicate for evaluating a halting condition. If the halting predicate is true, then the halting point 406 or another aspect of the augmented compute kernel 403 can write a program counter corresponding to the program counter label, temporaries, thread local variables, and other intermediate data to an offline register file and return to the process. The program counter can include a one-to-one mapping with the halting points 406.

The management service 316 can augment the original compute kernel with instructions that can save its execution state into the offline register file at the halting points 406. In some cases, the code for the halting points 406 include this functionality. To support resuming using a saved offline register file, the augmented compute kernel 403 can be prepended with jump instructions for matching program counter values to their halting points 406. The offline register file can be considered a portion of the working set 106.

The augmented compute kernel 403 can support suspend or halt commands that save the compute kernel intermediate data to the offline register file. The augmented compute kernel 403 can also support resume operations that can load the augmented compute kernel 403 using the intermediate data rather than restarting with initial values. The management service 316 can issue suspend and resume commands. If a suspend command is received, for example by a compute accelerator 203 or host 206, the augmented compute kernel 403 can halt at the next halting point 406 and flush all pending writes to the offline register file and memory assigned to or bound to the compute accelerator 203 or host 206. If a resume command is received, the offline register file and the memory assigned to the original compute kernel 403 can be copied to the memory assigned to the destination host 206. The augmented compute kernel 403 can be suspended and subsequently resumed on the same host 206, or the augmented compute kernel 403 can be suspended on one host 206 and resumed on a different host 206.

The augmented compute kernel 403 can also include performance counters 409. The performance counters 409 can provide an accurate measure of performance or efficiency of the augmented compute kernel 403 on a candidate host 206. As discussed earlier, existing solutions can inaccurately predict performance of the compute accelerator workload 100. For example, if an interconnect is slow, resource utilization such as CPU utilization can be low, and can mislead a load balancing algorithm of the management service 316. However, the performance counters 409 can provide a measured performance or efficiency of the compute accelerator workload 100.

The performance counters 409 can include a non-local page reference velocity counter. A non-local page reference velocity can refer to the reference rate for non-local page accesses including the main memory access or read operations. This can be dependent on bus contention, memory management unit (MMU) contention, and cache locality. The non-local page reference velocity counter can be a counter that is incremented in order to calculate the non-local page reference velocity over a simulation time.

The performance counters 409 can include a non-local page dirty velocity counter. A non-local page dirty velocity can refer to the dirty rate for non-local page modifications including main memory modifications or write operations. This can be dependent on bus contention and MMU contention. This can also affect cache locality for the CPU. The non-local page dirty velocity counter can be a counter that is incremented in order to calculate the non-local page dirty velocity over a simulation time.

The performance counters 409 can include a local page reference velocity counter. A local page reference velocity can refer to the reference rate for local page accesses including compute accelerator device memory access or read operations. The local page reference velocity counter can be a counter that is incremented in order to calculate the local page reference velocity over a simulation time.

The performance counters 409 can include a local page dirty velocity counter. A local page dirty velocity can refer to the dirty rate for local page modifications including compute accelerator device memory modifications or write operations. The local page dirty velocity counter can be a counter that is incremented in order to calculate the local page dirty velocity over a simulation time.

The performance counters 409 can include an execution velocity counter. The execution velocity counter can be incremented at a halting point 406. The execution velocity counter is incremented each time a halting point is reached. The execution velocity counter can be incremented by a number of implied instructions that have executed since the previous update of the execution velocity counter. This can include instructions from augmentation. To provide consistency, the implied instruction count can be low-level virtual machine (LLVM), an intermediate representation (IR), relative based to avoid inconsistencies introduced by various implementations of a single instruction that may represent multiple instructions. The various performance counters 409 can be added in descending order of latency and dependency depth from instruction execution.

The management service 316 can clone the compute accelerator workload 100 for execution by a number of candidate hosts 206a . . . 206n. Portions of the compute accelerator workload 100 can be cloned to the compute accelerators 203 of the hosts 206. In other words, the management service 316 can generate cloned workloads 412a . . . 412n to a set of candidate hosts 206a . . . 206n for execution.

The cloned workloads 412 can include the working set 106, including intermediate data if the cloned workloads 412 are based on a compute accelerator workload 100 that is already executing in the networked environment 300. For example, the management service 316 can suspend the compute accelerator workload 100 at a halting point 406 and include the intermediate data in the cloned workloads 412a. The cloned workloads 412 can be executed for a predetermined or arbitrary simulation time on the candidate hosts 206a . . . 206n to generate the efficiency metrics 415a . . . 415n based on the performance counters 409. The management service 316 can query the performance counters 409 in real time to generate the efficiency metrics 415. The management service 316 can then utilize the efficiency metrics 415 as part of its load balancing algorithm for initial placement or migration of the compute accelerator workload 100.

Figure 5:
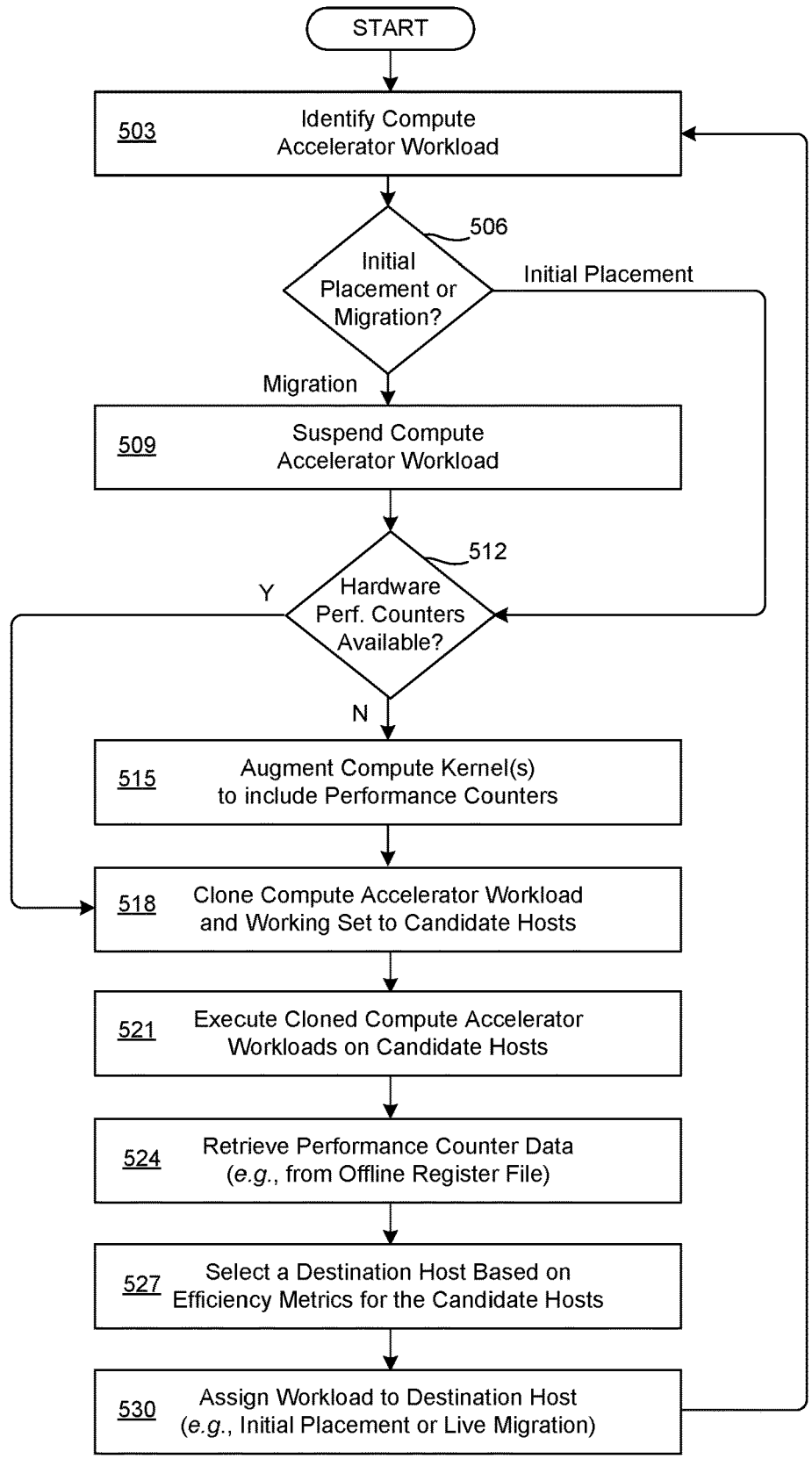
FIG. 5 is a flowchart illustrating an example of functionalities performed by components of the networked environment of FIG. 3, according to various embodiments of the present disclosure.

FIG. 5 shows a flowchart that describes functionalities performed by components of the networked environment 300 of FIG. 3. Generally, the flowchart describes how the components of the networked environment work in concert to perform real-time simulation of compute accelerator workloads 100 for distributed resource scheduling. While the flowchart describes actions with respect to the management service 316, the actions can also include actions performed by other components of the networked environment 300.

In step 503, the management service 316 can identify a compute accelerator workload 100. The management service 316 can monitor the managed computing environment 303 for workloads that are to be analyzed for initial placement or migration. The workloads can include compute accelerator workloads 100. The management service 316 can identify the compute accelerator workload 100 for initial placement automatically in response to an increase in demand for a functionality provided by the compute accelerator workload 100, or manually in response to a user request to execute the compute accelerator workload 100 in the managed computing environment 303. The management service 316 can identify the compute accelerator workload 100 for migration automatically based on resource usage of the various hosts 206 and a load balancing algorithm, or manually in response to a user request to migrate the compute accelerator workload 100.

In step 506, the management service 316 can determine whether the compute accelerator workload 100 is identified for initial placement or migration. For example, the management service 316 can determine whether the identified compute accelerator workload 100 is currently executing in the managed computing environment 300. For example, if the compute accelerator workload 100 is currently executing, then the accelerator workload 100 is identified for migration. Otherwise, the compute accelerator workload 100 is identified for initial placement. If the compute accelerator workload 100 is identified for migration, the management service 316 can proceed to step 509. If the compute accelerator workload 100 is identified for initial placement, the management service 316 can proceed to step 512.

In step 509, the management service 316 can suspend the compute accelerator workload 100. For example, the compute accelerator workload 100 can include halting points 406. The halting points 406 can enable the management service 316 to suspend and resume an augmented compute kernels 403 of the compute accelerator workload 100. The management service 316 can transmit a suspend request or a suspend command to a compute accelerator 203 or host 206 executing the compute accelerator workload 100. The augmented compute kernel 403 can halt at the next halting point 406 and flush all pending writes to the offline register file and memory assigned to or bound to the compute accelerator 203 or host 206.

In step 512, the management service 316 can determine whether hardware performance counters are available. For example, some compute accelerators 203 can include hardware-based counters that can be utilized to determine performance of a compute accelerator workload 100 that is executing thereon. In some examples, the hardware counters can provide a measure of computational cycles or another measure of utilization of the compute accelerator 203. The hardware counters can be utilized to identify a non-local page reference velocity, a non-local page dirty velocity, a local page reference velocity, a local page dirty velocity, and an execution velocity for the compute accelerator workload 100. If the hardware performance counters are unavailable, then the management service 316 can proceed to step 515. If the hardware performance counters are available, then the management service 316 can proceed to step 518.

In step 515, the management service 316 can augment the compute kernels of the compute accelerator workload 100 to include performance counters 409. The compute kernels can include augmented compute kernels 403 that have already been augmented to include halting points 406, or unaugmented compute kernels 103, for example, compute kernels 103 that are being considered for initial placement. If the compute kernels 103 do not include halting points 406, then the management service 316 can add halting points 406 and performance counters 409 to the compute kernels 103. Otherwise, the management service 316 can augment the compute kernels 403 to include performance counters 409. The performance counters 409 can include a non-local page reference velocity counter, a non-local page dirty velocity counter, a local page reference velocity counter, a local page dirty velocity counter, and an execution velocity counter.

The non-local page reference velocity counter can refer to a software-implemented counter that increments or otherwise identifies the reference rate for non-local page accesses including main memory access or read operations. The non-local page dirty velocity counter can refer to a software-implemented counter that increments or otherwise identifies the dirty rate for non-local page modifications including main memory modifications or write operations. The local page reference velocity counter can refer to a software-implemented counter that increments or otherwise identifies the reference rate for local page accesses including compute accelerator device memory access or read operations. The local page dirty velocity counter can refer to a software-implemented counter that increments or otherwise identifies the dirty rate for local page modifications including compute accelerator device memory modifications or write operations. The execution velocity counter can refer to a software-implemented counter that increments or otherwise identifies a number of implied instructions that have executed since the previous update of the execution velocity counter. The execution velocity counter can be incremented at halting points 406.

In step 518, the management service 316 can clone the compute accelerator workload 100, including its augmented compute kernels 403 and working set 106, to a set of candidate hosts 206. For example, if the compute accelerator workload 100 is being considered for migration, then the management service 316 can copy a cloned version of the compute accelerator workload 100 that includes program counter labels, temporaries, thread local variables, and other intermediate data in its working set 106. The cloned versions of the compute accelerator workload 100 can generally refer to multiple copies of the compute accelerator workload 100 that are broadcast to candidate hosts 206 for real-time simulation.

In step 521, the management service 316 can execute the cloned compute accelerator workloads 412 on the set of candidate hosts 206. The cloned compute accelerator workloads 412 can be executed to provide real-time simulation of the performance of the compute accelerator workload 100. The simulation time can include a predetermined period of time, or the simulation can run until a resource scheduling (e.g., placement or migration) decision is made. If the compute accelerator workload 100 was suspended, the cloned compute accelerator workloads 412 can be resumed, or initialized using intermediate data from the original compute accelerator workload 100. If the simulation time is predetermined, then the management service 316 can suspend the cloned compute accelerator workloads 412 once the simulation time has elapsed. Each of the cloned compute accelerator workloads 412 can halt at the next halting point 406 and flush all pending intermediate data to the assigned register file and memory of the compute accelerator 203 and the host 206. At this point, each of the compute accelerator workloads 412 can have a different working set 106 with different intermediate data, based on the performance of each of the cloned compute accelerator workloads 412 on the candidate hosts 206.

In step 524, the management service 316 can retrieve performance counter data for each candidate host 206. The management service 316 can determine an efficiency metric 415 for each candidate host 206 based on the performance counter data for that host 206. Performance counter data can be retrieved from an offline register file or memory location specified by the performance counters 409 of the augmented computer kernel 403. The performance counter data can also be retrieved from a memory location utilized by a hardware counter.

In step 527, the management service 316 can select a destination host 206 from the set of candidate hosts 206 based on the efficiency metrics 415 for the candidate hosts 206. The management service 316 can include a resource scheduling algorithm that identifies the destination host 206. The resource scheduling algorithm can utilize the efficiency metrics 415 along with other hardware resource utilization information to determine the destination host 206.

In step 530, the management service 316 can assign the compute accelerator workload 100 to the selected destination host 206. If the cloned compute accelerator workload 412 was suspended on the destination host 206 after the simulation time, then the management service 316 can transmit a request to resume the cloned compute accelerator workload 412 on the destination host 206. However, if the cloned compute accelerator workloads 412 were not suspended, then the management service 120 can suspend the cloned compute accelerator workloads 412 on a subset of the candidate hosts 206 that excludes the destination host 206. In other words, the cloned compute accelerator workload 412 can continue on the destination host 206 while being halted on the other candidate hosts 206. The management service 316 can also remove or clean up the cloned compute accelerator workloads 412 on the subset of the candidate hosts 206. In some examples, the destination host 206 can be the candidate host 206 with the best or optimal efficiency metric 415. However, in other cases, the destination host 206 can be a candidate host 206 that is selected based on a resource scheduling algorithm that balances the efficiency metric 415 and other factors.

Although the services, programs, and computer instructions described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Although the flowchart of FIG. 5 shows a specific order of execution, it is understood that the order of execution can differ from that which is depicted. For example, the order of execution of two or more blocks can be scrambled relative to the order shown. The flowchart can be viewed as depicting an example of a method implemented in the managed computing environment 303. The flowchart can also be viewed as depicting an example of instructions executed in a computing device of the managed computing environment 303. Also, two or more blocks shown in succession can be executed concurrently or with partial concurrence. Further, in some embodiments, one or more of the blocks shown can be skipped or omitted. In addition, any number of counters, state variables, semaphores, or warning messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium, which can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including, for example, static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. While aspects of the disclosure can be described with respect to a specific figure, it is understood that the aspects are applicable and combinable with aspects described with respect to other figures. All such modifications and variations are intended to be included herein within the scope of this disclosure.

Therefore, the following is claimed:

1. A non-transitory, computer-readable medium comprising machine-readable instructions that, when executed by at least one processor, cause at least one computing device to at least:
identify a compute accelerator workload and a working set for the compute accelerator workload;
augment a compute kernel of the compute accelerator workload to be an augmented compute kernel comprising instructions that increment an execution counter at a plurality of artificial halting points inserted into the compute kernel;
execute the compute accelerator workload comprising the augmented compute kernel on a plurality of candidate hosts to select a destination host for the compute accelerator workload;
select the destination host from the plurality of candidate hosts based at least in part on a plurality of efficiency metrics corresponding to execution of the compute accelerator workload on the plurality of candidate hosts; and
assign the compute accelerator workload to execute on the destination host.

2. The non-transitory, computer-readable medium of claim 1, wherein the instructions, when executed by the at least one processor, cause the at least one computing device to at least:
determine the plurality of efficiency metrics corresponding to the plurality of candidate hosts based at least in part on a plurality of performance counters incremented during execution of the compute accelerator workload on a respective candidate host.

3. The non-transitory, computer-readable medium of claim 2, wherein a respective efficiency metric comprises at least one of: a non-local page reference velocity, a non-local page dirty velocity, a device-local page reference velocity, a device-local page dirty velocity, and an execution velocity.

4. The non-transitory, computer-readable medium of claim 3, wherein the instructions, when executed by the at least one processor, cause the at least one computing device to at least:
query the plurality of performance counters in real time to determine the respective efficiency metric.

5. The non-transitory, computer-readable medium of claim 2, wherein at least one of the plurality of performance counters comprises a hardware performance counter.

6. The non-transitory, computer-readable medium of claim 2, wherein the instructions, when executed by the at least one processor, cause the at least one computing device to at least:
insert, into a compute kernel of the compute accelerator workload, instructions to increment the performance counter at a memory load instruction, a memory store instruction, or a halting point of the compute kernel.

7. The non-transitory, computer-readable medium of claim 1, wherein the working set comprises at least one of: initialization data provided to the compute accelerator workload to begin execution, and intermediate data identified at a halting point of the compute accelerator workload.

8. A method, comprising:
augmenting a compute kernel of a compute accelerator workload to be an augmented compute kernel comprising instructions that increment an execution counter at a plurality of artificial halting points of the augmented compute kernel;
executing the compute accelerator workload on a plurality of candidate hosts to select a destination host for the compute accelerator workload;
determining a plurality of efficiency metrics corresponding to the plurality of candidate hosts, a respective efficiency metric being determined based at least in part on at least one performance counter comprising the execution counter incremented by the augmented compute kernel during execution of the compute accelerator workload on a compute accelerator of a respective candidate host;
selecting the destination host from the plurality of candidate hosts based at least in part on an efficiency metric for the compute accelerator workload on the destination host; and
assigning the compute accelerator workload to execute on the destination host.

9. The method of claim 8, wherein the compute accelerator workload is cloned to the plurality of candidate hosts along with a working set for the compute accelerator workload.

10. The method of claim 9, wherein the working set comprises initialization data provided to the compute accelerator workload to begin execution.

11. The method of claim 9, wherein the compute accelerator workload is analyzed for migration from a source host, and the working set comprises intermediate data identified on the source host at a halting point of the compute accelerator workload.

12. The method of claim 8, wherein the augmented compute accelerator workload includes instructions to increment a page reference counter.

13. The method of claim 8, wherein the augmented compute accelerator workload includes instructions to increment a page dirty counter.

14. The method of claim 8, wherein the artificial halting points are inserted at a plurality of loop iterations of the compute accelerator workload.

* * * * *